United States Patent
Lin et al.

(10) Patent No.: US 11,265,814 B2
(45) Date of Patent: Mar. 1, 2022

(54) IMPLEMENTATION METHOD OF LOW POWER CONSUMPTION INTERNET OF THINGS BASED ON PROXY APPARATUS

(71) Applicant: Espressif Systems (Shanghai) Co., Ltd., Shanghai (CN)

(72) Inventors: Hao Lin, Shanghai (CN); Rui Zhan, Shanghai (CN)

(73) Assignee: Espressif Systems (Shanghai) Co. Ltd., Shanghai (CN)

( * ) Notice: Subject to any disclaimer, the term of this patent is extended or adjusted under 35 U.S.C. 154(b) by 125 days.

(21) Appl. No.: 15/577,523

(22) PCT Filed: Jul. 8, 2015

(86) PCT No.: PCT/CN2015/083610
§ 371 (c)(1),
(2) Date: Nov. 28, 2017

(87) PCT Pub. No.: WO2016/192172
PCT Pub. Date: Dec. 8, 2016

(65) Prior Publication Data
US 2018/0152894 A1   May 31, 2018

(30) Foreign Application Priority Data
May 29, 2015 (CN) .......................... 201510288713.7

(51) Int. Cl.
*H04W 52/02* (2009.01)
*H04L 29/08* (2006.01)
(Continued)

(52) U.S. Cl.
CPC ......... *H04W 52/0241* (2013.01); *H04L 29/08* (2013.01); *H04L 67/2828* (2013.01);
(Continued)

(58) Field of Classification Search
CPC ... H04L 29/08; H04L 67/2828; H04L 67/125; H04W 52/0241; H04W 52/0216;
(Continued)

(56) References Cited

U.S. PATENT DOCUMENTS 8,478,450 B2 * 7/2013 Lu ...................... H04L 12/2807
361/104
9,439,142 B2 * 9/2016 Zhu .................... H04W 52/0216
(Continued)

FOREIGN PATENT DOCUMENTS

| CN | 102143570 A | 8/2011 |
| CN | 102324184 A | 1/2012 |

(Continued)

*Primary Examiner* — Jeffrey M Rutkowski
*Assistant Examiner* — Jasper Kwoh
(74) *Attorney, Agent, or Firm* — Reinhart Boerner Van Deuren P.C.

(57) ABSTRACT

A method for implementing a low power consumption IoT network based on a Wi-Fi proxy device. The network is used for low power consumption data exchange between a Wi-Fi IoT device having a long data period in a Wi-Fi IoT network and an internet server, via a Wi-Fi proxy IoT device and a Wi-Fi access point. A low power consumption Wi-Fi MAC layer link is provided between the proxy device and at least one Wi-Fi IoT device. The Wi-Fi IoT device only establishes a low power consumption Wi-Fi MAC layer link with the proxy device. The proxy device connects to the internet server via a Wi-Fi access point, and acts as a data receiving end to buffer data, from the internet server, that is sent to the Wi-Fi IoT device via the Wi-Fi MAC layer link.

19 Claims, 1 Drawing Sheet

(51) Int. Cl.
  *H04W 88/18*    (2009.01)
  *H04W 84/12*    (2009.01)
  *H04L 65/40*    (2022.01)
  *H04L 67/5651*  (2022.01)
  *H04L 67/125*   (2022.01)

(52) U.S. Cl.
  CPC ... *H04W 52/0216* (2013.01); *H04W 52/0229* (2013.01); *H04W 52/0235* (2013.01); *H04W 52/0261* (2013.01); *H04W 88/182* (2013.01); *H04L 67/125* (2013.01); *H04W 84/12* (2013.01); *Y02D 30/70* (2020.08)

(58) Field of Classification Search
  CPC ......... H04W 52/0229; H04W 52/0235; H04W 52/0261; H04W 88/182; H04W 84/12; Y02D 70/14; Y02D 70/142; Y02D 70/10
  See application file for complete search history.

(56) References Cited

U.S. PATENT DOCUMENTS

| | | | | |
|---|---|---|---|---|
| 2010/0217847 | A1* | 8/2010 | Cook | H04L 29/12584 709/222 |
| 2011/0149804 | A1* | 6/2011 | Denteneer | H04W 40/22 370/254 |
| 2011/0299454 | A1 | 12/2011 | Krishnaswamy | |
| 2014/0201212 | A1* | 7/2014 | Qi | H04L 67/303 707/741 |
| 2014/0376521 | A1* | 12/2014 | Wang | H04W 4/70 370/336 |
| 2015/0358777 | A1* | 12/2015 | Gupta | H04L 12/2807 370/254 |
| 2015/0365217 | A1* | 12/2015 | Scholten | H04L 5/0053 370/315 |
| 2015/0381776 | A1* | 12/2015 | Seed | H04W 4/70 709/203 |
| 2016/0029346 | A1* | 1/2016 | Suresh | H04W 72/005 340/539.16 |
| 2016/0100023 | A1* | 4/2016 | Kim | H04L 67/28 709/227 |
| 2016/0255676 | A1* | 9/2016 | Vajapeyam | H04W 16/14 370/329 |
| 2017/0127370 | A1* | 5/2017 | Wang | H04W 48/10 |
| 2017/0279775 | A1* | 9/2017 | Savolainen | H04L 63/0281 |

FOREIGN PATENT DOCUMENTS

| | | |
|---|---|---|
| CN | 102571507 A | 7/2012 |
| CN | 102760363 A | 10/2012 |
| CN | 103313303 A | 9/2013 |
| CN | 103546909 A | 1/2014 |
| CN | 103632570 A | 3/2014 |
| CN | 104038989 A | 9/2014 |
| CN | 104206001 A | 12/2014 |
| CN | 204836236 U | 12/2015 |
| WO | WO 2013/184505 A2 | 12/2013 |

* cited by examiner

IMPLEMENTATION METHOD OF LOW POWER CONSUMPTION INTERNET OF THINGS BASED ON PROXY APPARATUS

TECHNICAL FIELD

The present invention relates to a technology in the field of wireless communications, particularly to a method for implementing a low power consumption Internet of Things (IoT) network based on a proxy device, which is used for low power consumption data exchange between a Wi-Fi IoT device having a long data period in a Wi-Fi IoT network and an internet server via a Wi-Fi proxy IoT device and a Wi-Fi access point.

BACKGROUND ART

Internet of Things is abbreviated as IoT. An IoT device may be various information sensors and controllers, or may be various intelligentized home appliances. IoT devices access internet in many different ways, so as to form a huge network, and extend the internet from people to things.

Wi-Fi IoT access mode is one of the most widely applied IoT access modes with lowest cost and best extensibility. Usually, a Wi-Fi IoT device accesses network directly via a Wi-Fi access point (AP, Access Point, also called Wi-Fi hotspot or wireless router), so as to perform data exchange with an internet server.

However, most Wi-Fi IoT devices have a single or limited functions, and relatively small data exchange volume; moreover, a period at which a Wi-Fi IoT device generates data and needs to exchange data packets with an internet server is very long, for example, from several hours to several days. Assuming that a Wi-Fi IoT device having a long data period performs data exchange with a server via an IP layer link, then it is usually performed in the following two ways: 1) always maintaining the IP layer link between the device and the server via the Wi-Fi access point, which requires continuously sending packets to maintain the link, so as to prevent timeout disconnection; and 2) each time when exchange of data packets is needed, IP layer and above layer link with the internet server has to be re-established via the Wi-Fi access point.

For a Wi-Fi IoT device having a long data period which is usually powered by a battery device, the two above described ways spend most data exchange and device energy on exchange of non-effective data, and consume too much energy on redundant data, which are not reasonable. Thus, a Wi-Fi IoT device having a long data period needs a novel approach of management, so as to meet low power consumption requirements in applications.

Moreover, although the Wi-Fi access point may buffer data for a sleeping device, and wait to send the data when the sleeping device wakes up, if the Wi-Fi IoT network is large, buffer management burden for the Wi-Fi access point will be correspondingly heavy, and after a certain time is elapsed, the Wi-Fi access point may discard the buffered data.

Through searches against the prior arts, it is found that a Chinese patent literature with publication No. CN104206001A published on Dec. 10, 2014 has disclosed an access point for wireless local area network (WLAN), which may better manage the buffered data transmission of a sleeping Wi-Fi device, and lower the data transmission power consumption of the sleeping device.

Another Chinese patent literature with publication No. CN103546909A published on Jan. 29, 2014 has disclosed a method for terminal energy saving power consumption management in a WLAN network based on 802.11u protocol, in which a terminal STA is only in an activated state or a sleeping state, and an AP buffers data for the access terminal STA, wherein the AP and the terminal STA perform information exchange through GAS signaling in 802.11u protocol, and during one transmission period, any terminal STA with buffered data can have one opportunity to receive the data.

However, the two above described technologies both attempt to be based on 802.11 protocol family to perform power saving optimization locally, so are both associated with the following two problems:

a) a low power consumption IoT device still needs to establish and maintain IP layer connection relationship with a server on the cloud, which may consume precious energy from a battery power supply device.

b) in the two above described technologies, the sleeping Wi-Fi device is restricted by requirements of 802.11 protocol, such that a wake-up period has to be in a range processable by a normal Wi-Fi link, for example, from several seconds to several minutes; and in order to maintain such a Wi-Fi connection, it will also consume energy of the Wi-Fi IoT device having a long data period with battery power supply. In summary, the two above described technologies have not considered about the characteristics of Wi-Fi IoT devices having a long data period and have not taken into account the server on the cloud and other Wi-Fi IoT devices for systematic optimization.

SUMMARY OF THE INVENTION

In view of the above described defects in the prior arts, the present invention proposes a method for implementing a low power consumption IoT network based on a proxy device, which uses the proxy device to implement data exchange between a Wi-Fi IoT device having a long data period with an internet server via a Wi-Fi access point, and does not require any modification of the Wi-Fi access point.

The present invention may be implemented by the following technical solution:

The present invention relates to a method for implementing a low power consumption IoT network based on a Wi-Fi proxy device, comprising firstly pre-establishing a low power consumption Wi-Fi MAC layer link between the proxy device and at least one Wi-Fi IoT device; when the Wi-Fi IoT device needs to perform data exchange with an internet server (e.g., IoT cloud server), carrying data in a packet payload (payload) structure defined in MAC layer, performing data pre-exchange with the proxy device via said low power consumption Wi-Fi MAC layer link, and after the pre-exchange having completed, entering into a low power consumption sleeping state (closing wireless transceiving portion, etc.), and the proxy device forwarding data received in the pre-exchange to the internet server through an IP address and a high level protocol (e.g., TCP) specified in the MAC layer packet payload, via IP layer and above layer link.

Said Wi-Fi IoT device only establishes a low power consumption Wi-Fi MAC layer link with the proxy device, without normal Wi-Fi link at IP layer and above layer link, because the link executes a private protocol, which may set a very long maximum wake-up period (e.g., several hundred hours), and may ensure the low power consumption Wi-Fi MAC layer link does not disconnect when the Wi-Fi IoT device having a long data period is sleeping, and the low power consumption Wi-Fi MAC layer link may be established through authentication and encryption of a conventional standard Wi-Fi MAC layer link, or may be established through a non-standard, privately defined MAC layer link.

Said proxy device uses a standard 802.11 protocol to connect to the Wi-Fi access point so as to connect to the internet server.

Said MAC layer packet payload includes: a data portion and a payload header (server IP address and high level protocol type) encapsulating the data portion, wherein: the data portion including a data type, a data body and a sleep flag; and the proxy device determines a path for forwarding the data according to the IP address in the MAC layer packet payload, and determines a high level link according to the high level protocol type.

Said data portion carries various data including sensor measurement data, device sleep start/end signal, control command, control command response, event notification, etc., and may be customized according to scenarios of application.

Said proxy device implements data forwarding in the following manner:

1) the proxy device always maintains IP layer and above layer link to the internet server by uninterruptedly sending packets, and when the proxy device has received pre-exchange data from the Wi-Fi IoT device, it forwards the pre-exchange data to the internet server directly in the above described link;

2) when the proxy device has received the pre-exchange data from the Wi-Fi IoT device, a link connection to the internet server is re-established (e.g., re-established the IP layer and above layer link to the server via the Wi-Fi access point), and then the pre-exchange data is forwarded to the internet server in the above described link.

3) when the internet server has internet data to be sent to the Wi-Fi IoT device via the link (via the Wi-Fi access point), when the Wi-Fi IoT device is in the low power consumption sleeping state, the proxy device acts as a data receiving end to buffer the above described data, and after a current low power consumption sleeping state of the Wi-Fi IoT device is ended, the buffered internet data is transmitted over the previously established low power consumption Wi-Fi MAC layer link.

Said proxy device and the Wi-Fi IoT device may implement tracking of the low power consumption sleeping state in the following manner, specifically:

A) when the Wi-Fi IoT device is about to enter into the low power consumption sleeping state, carrying a sleep start signal to be sent to the proxy device in the MAC packet payload to be sent;

B) when the Wi-Fi IoT device exits the low power consumption sleeping state and needs to transmit data over the previously established low power consumption Wi-Fi MAC layer link, carrying a sleep end signal in the MAC packet payload to be sent and sending the sleep end signal;

C) the proxy device periodically listens to the above described sleep start signal and sleep end signal, and correspondingly starts an internet data buffering process or pre-exchange data forwarding process between the proxy device and the internet server.

When the Wi-Fi IoT device ends sleeping and prepares to transmit data, if a sleeping time does not exceed a maximum wake-up period of the low power consumption Wi-Fi MAC layer link, then the low power consumption Wi-Fi MAC layer link between the device and the IoT proxy device is not disconnected, so data pre-exchange may be performed directly on the original low power consumption Wi-Fi MAC layer link;

When the sleeping time exceeds the maximum wake-up period set for the low power consumption Wi-Fi MAC layer link, the low power consumption Wi-Fi MAC layer link between the device and the IoT proxy device is disconnected, so it is needed to firstly establish the link according to the above described process for establishing the low power consumption Wi-Fi MAC layer link, and then performs data pre-exchange over the low power consumption Wi-Fi MAC layer link.

In order to achieve an optimal low power consumption mode, the maximum wake-up period of the connection may be set to an appropriate time according to scenarios of application, so as to reduce re-establishment of the low power consumption Wi-Fi MAC layer connect as much as possible.

The low power consumption sleeping state of said Wi-Fi IoT device may be implemented as but does not limit to several hours, several days, or several months, wherein the low power consumption sleeping state may be ended periodically (e.g., a Wi-Fi temperature sensor of a home temperature monitoring network may be set to acquire current temperature every 4 hours; or it may be ended non-periodically (e.g., when a Wi-Fi illumination switch is touched by a user).

In a preferred circumstance, when the Wi-Fi IoT device having a long data period needs software upgrade for itself:

i) utilize said low power consumption Wi-Fi MAC layer link to obtain upgraded software from the internet server via the proxy device;

ii) the Wi-Fi IoT device connects to the internet server via a normal Wi-Fi link with the AP, and obtains upgraded software.

Said Wi-Fi IoT device includes, but not limited to: Wi-Fi sensing device and data acquisition device (e.g., Wi-Fi temperature sensor, Wi-Fi humidity sensor, etc.), Wi-Fi illumination switch, switch device, e.g., Wi-Fi heating (floor heating) switch, etc.

Said proxy device includes, but not limited to: Wi-Fi illumination device with power supply from a power line, Wi-Fi IoT device having sufficient power supply, such as a Wi-Fi socket.

DETAILED DESCRIPTION OF THE EMBODIMENTS

Embodiments of the present invention will be described in detail in the following, and these embodiments are implemented according to the technical solution of the present invention, illustrative of detailed implementation and detailed operating process, but the scope of protection of the present invention does not limit to the embodiments described below.

Embodiment 1

Figure 1:
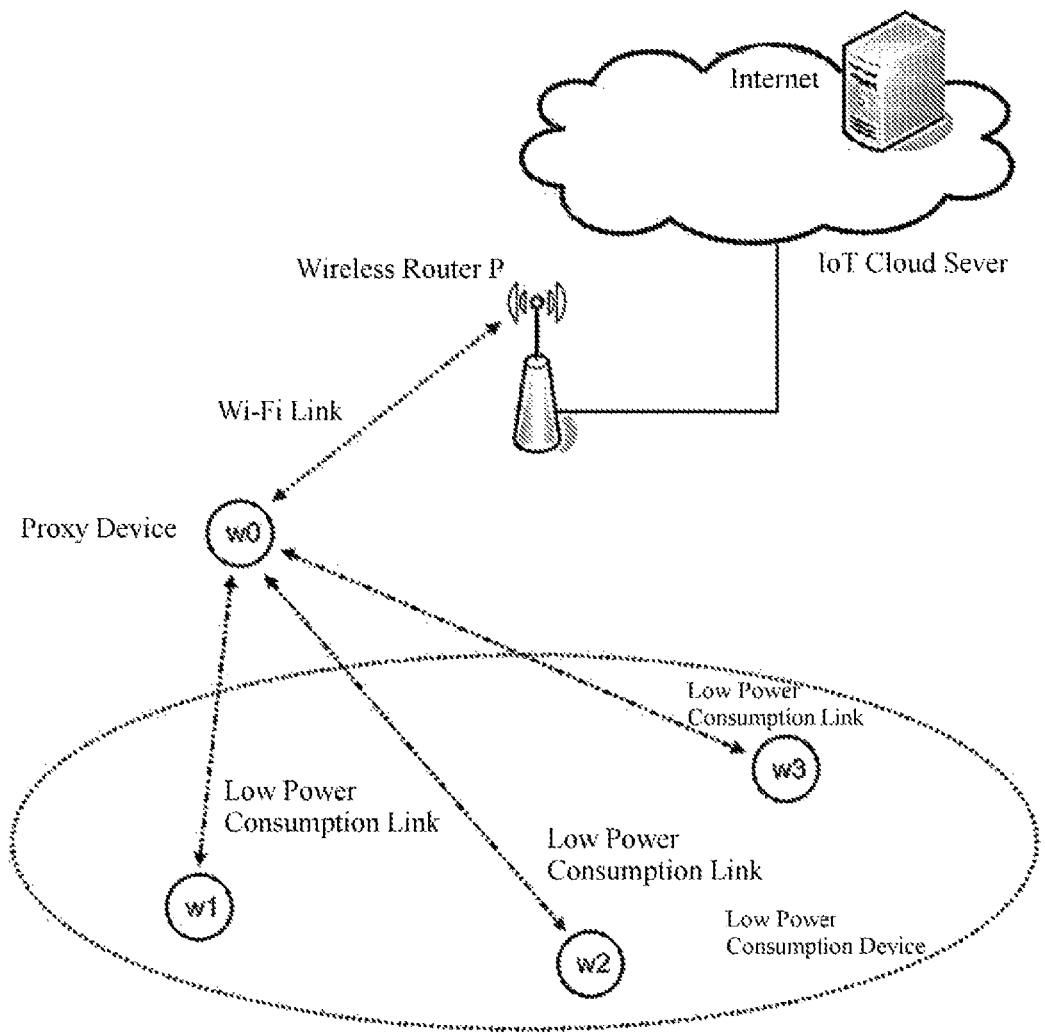
FIG. 1 is an illustrative structural diagram of an embodiment.

As shown in FIG. 1, the present embodiment relates to architecture of a low power consumption IoT network, including: a proxy device, Wi-Fi IoT devices, and an internet server in wireless connection with them, wherein: a cache is provided in the proxy device.

Said proxy device and the Wi-Fi IoT device support low power consumption Wi-Fi link, may support a function of data transmission at extended interval time, and may perform data exchange with Wi-Fi IoT devices having a long data period.

Said IoT proxy device does not limit to having additionally comprehensive Wi-Fi IoT device functions, but may perform its own data exchange with the access point. For example, if a Wi-Fi illumination device is used as the IoT proxy device, after having access to the Wi-Fi access point, it may be controlled by a mobile phone application to receive illumination control commands transmitted via the Wi-Fi access point.

The above described architecture operates in the following manner: when the Wi-Fi IoT device needs to perform data exchange with the internet server (e.g., IoT cloud server), carrying in data in a packet payload defined in MAC layer, performing data pre-exchange with the proxy device via said low power consumption Wi-Fi MAC layer link, and after the pre-exchange having completed, entering into a low power consumption sleeping state (closing wireless transceiving portion, etc.), and the proxy device forwarding data received in the pre-exchange to the internet server through an IP address and a high level protocol (e.g., TCP) specified in the MAC layer packet payload, via IP layer and above layer link.

Figure 2:
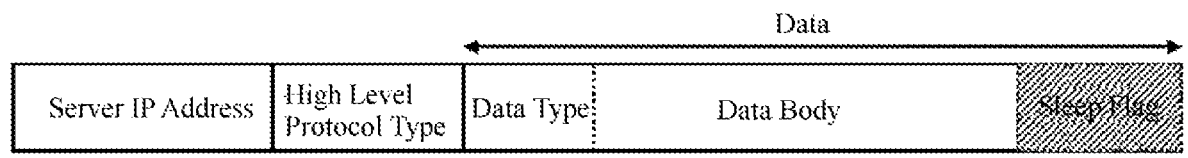
FIG. 2 is an illustrative diagram of MAC layer packet payload structure.

As shown in FIG. 2, said MAC layer packet payload includes: a data portion and a payload header encapsulating the data portion, wherein: the data portion includes a data type, a data body, and a sleep flag; and the payload header includes a server IP address, and a high level protocol type (e.g., TCP, UDP, etc.).

Said proxy device determines a path for forwarding the data according to the IP address in the MAC layer packet payload, and determines a high level link according to the high level protocol type.

Said data type includes: Command, Response, and Event, wherein: the Command type is to be sent by the IoT device, and its data body may carry queries, control information, etc. The Response type is for response by the IoT proxy device to the IoT device, and its data body portion carries information forwarded by the server to the IoT device. The Event type is a main data transmission type, and its data body portion may carry sensor measurement data, etc.

Since in most circumstances, the IoT device only sends small amount of data carried by Event type after having ended sleeping, it does not need to perform data exchange with the server, so it is may be expediently provided that the device sleep start/end flag is only carried on a tail part of the Event data portion.

Taking FIG. 1 as an example, if w1, w2, and w3 are Wi-Fi temperature sensor devices, which at a period of several hours, acquire temperature information and send the information to the server; the Wi-Fi proxy IoT device is a Wi-Fi socket or Wi-Fi illumination device nearby. When initially creating the Wi-Fi IoT network, interlinks of the whole network are established as follows.

Links between the Wi-Fi IoT devices having a long data period (namely w1, w2, and w3) and the Wi-Fi proxy IoT device w: it may establish the Wi-Fi MAC layer link through a private protocol process, or may also be established through a normal Wi-Fi MAC layer link establishing process. Subsequently, w0 and w1, w2, w3 respectively negotiate a data exchange period, agree a period start time, such that the establishment of each low power consumption Wi-Fi MAC layer link is now completed. Each time after the Wi-Fi IoT device having a long data period has woken up at the agreed period, it does not need to establish a link with the Wi-Fi proxy IoT device w0, but may directly perform data exchange.

Link between the Wi-Fi proxy IoT device w0 and the Wi-Fi access point P: establishing a Wi-Fi link through a normal Wi-Fi link establishing process.

Since the Wi-Fi proxy IoT device w0 has sufficient energy supply, it does not need to sleep.

Data exchange process in the Wi-Fi IoT network:

If the Wi-Fi proxy IoT device w0 needs to perform data exchange (possibly, its own data) with the Wi-Fi access point P, it may instantly complete normal Wi-Fi data exchange.

For data to be sent from the IoT cloud server to each Wi-Fi IoT device having a long data period, w1, w2, and w3, via the Wi-Fi access point P, if it is not within the agreed wake time, the data will be buffered by the Wi-Fi proxy IoT device w0.

At other times, the Wi-Fi proxy IoT device w0 may listen to wake-up of each Wi-Fi IoT device having a long data period, w1, w2, and w3, so as to prevent the Wi-Fi IoT device having a long data period in a sleeping state from clock skewing. When w0 has heard the wake-up of w1, w2, or w3, it receives data generated by w1, w2, or w3, and transmits the buffered data to the corresponding Wi-Fi IoT device having a long data period.

After having completed data exchange with the Wi-Fi IoT device having a long data period, and the device enters into sleep, the Wi-Fi IoT proxy device w0 will then send the data obtained from the Wi-Fi IoT device having a long data period to the cloud server via the Wi-Fi access point P.

Embodiment 2

When the Wi-Fi IoT device having a long data period is a Wi-Fi illumination switch, and the Wi-Fi IoT proxy device is a Wi-Fi illumination device, possible data exchange scenarios include, but not limit to, the following two scenarios:

1) the Wi-Fi illumination switch does not need to perform data exchange with the internet server; the Wi-Fi illumination switch and the Wi-Fi illumination device transmit illumination control information over a low power consumption Wi-Fi link; and the Wi-Fi illumination device does not forward the control information.

2) when the IoT cloud server counts a number of switch actuations, each time a user touches the Wi-Fi switch to control the Wi-Fi illumination device, illumination control information will be transmitted to the Wi-Fi illumination device via the low power consumption Wi-Fi link; the Wi-Fi illumination device may always maintain the link to the server or re-establish the link to the server, so as to send the actuation information of the Wi-Fi switch to the server via the Wi-Fi access point, for counting the number of Wi-Fi switch actuations.

The invention claimed is:

1. A method for implementing a low power consumption IoT network based on a Wi-Fi proxy device, comprising firstly pre-establishing a low power consumption Wi-Fi MAC layer link between the proxy device and at least one Wi-Fi IoT device in a private protocol setting a maximum wake-up period from several hundred hours to several months, wherein said Wi-Fi IoT device only establishes a low power consumption Wi-Fi MAC layer link with the proxy device, without a Wi-Fi link at IP layer and above layer between the Wi-Fi IoT device and the proxy device, and the proxy device directly connects to a Wi-Fi access point via an IP layer and above layer link so as to connect to an internet server;

wherein:

when the Wi-Fi IoT device needs to perform data exchange with the internet server, carrying data in a packet payload structure defined in MAC layer, performing data pre-exchange with the proxy device via said low power consumption Wi-Fi MAC layer link, and after the pre-exchange having completed, entering into a low power consumption sleeping state, and the proxy device forwarding data received in the pre-exchange to the internet server through an IP address and a high level protocol specified in the MAC layer packet payload, via the IP layer and above layer link; and when the internet server has internet data to be sent to the Wi-Fi Ica device via the link, when the Wi-Fi IoT device is in the low power consumption sleeping state, the proxy device acts as a data receiving end to buffer the above described data, and after a current low power consumption sleeping state of the Wi-Fi IoT device is ended, the buffered internet data is transmitted over the previously established low power consumption Wi-Fi MAC layer link.

2. The method for implementing a low power consumption IoT network based on a Wi-Fi proxy device according to claim 1, wherein the proxy device uses a standard 802.11 protocol to connect to the Wi-Fi access point.

3. The method for implementing a low power consumption IoT network based on a Wi-Fi proxy device according to claim 2, wherein said proxy device implements data forwarding in the following manner:
1) the proxy device always maintains the IP layer and above layer link to the internet server by uninterruptedly sending packets, and when the proxy device has received pre-exchange data from the Wi-Fi IoT device, it forwards the pre-exchange data to the internet server directly in the above described link;
2) when the proxy device has received the pre-exchange data from the Wi-Fi IoT device, a link connection to the internet server is re-established, and then the pre-exchange data is forwarded to the internet server in the above described link.

4. The method for implementing a low power consumption IoT network based on a Wi-Fi proxy device according to claim 1, wherein said MAC layer packet payload includes: a data portion, and a payload header encapsulating the data portion, wherein: the data portion includes a data type, a data body, and a sleep flag, wherein the proxy device determines a path for forwarding the data according to the IP address carried in the MAC layer packet payload, and determines a high level link according to a high level protocol type.

5. The method for implementing a low power consumption IoT network based on a Wi-Fi proxy device according to claim 4, wherein said proxy device implements data forwarding in the following manner;
1) the proxy device always maintains the IP layer and above layer link to the internet server by uninterruptedly sending packets, and when the proxy device has received pre-exchange data from the Wi-Fi IoT device, it forwards the pre-exchange data to the internet server directly in the above described link;
2) when the proxy device has received the pre-exchange data from the Wi-Fi IoT device, a link connection to the internet server is re-established, and then the pre-exchange data is forwarded to the internet server in the above described link.

6. The method for implementing a low power consumption IoT network based on a Wi-Fi proxy device according to claim 1, wherein said proxy device implements data forwarding in the following manner;
1) the proxy device always maintains the IP layer and above layer link to the internet server by uninterruptedly sending packets, and when the proxy device has received pre-exchange data from the Wi-Fi IoT device, it forwards the pre-exchange data to the internet server directly in the above described link;
2) when the proxy device has received the pre-exchange data from the Wi-Fi IoT device, a link connection to the internet server is re-established, and then the pre-exchange data is forwarded to the internet server in the above described link.

7. The method for implementing a low power consumption IoT network based on a Wi-Fi proxy device according to claim 6, wherein proxy device and the Wi-Fi IoT device implement tracking of the low power consumption sleeping state in the following manner, specifically:
A) when the Wi-Fi IoT device is about to enter into the low power consumption sleeping state, carrying a sleep start signal to be sent to the proxy device in the MAC packet payload to be sent;
B) when the Wi-Fi IoT device exits the low power consumption sleeping state and needs to transmit data over the previously established low power consumption Wi-Fi MAC layer link, carrying a sleep end signal in the MAC packet payload to be sent and sending the sleep end signal; and
C) the proxy device periodically listens to the above described sleep start signal and sleep end signal, and correspondingly starts an internet data buffering process or pre-exchange data forwarding process between the proxy device and the internet server.

8. The method for implementing a low power consumption IoT network based on a Wi-Fi proxy device according to claim 7, wherein when the Wi-Fi IoT device ends sleeping and prepares to transmit data, if a sleeping time does not exceed the maximum wake-up period of the low power consumption Wi-Fi MAC layer link, then the low power consumption Wi-Fi MAC layer link between the device and the IoT proxy device is not disconnected, so data pre-exchange is performed directly on the original low power consumption Wi-Fi MAC layer link; when the sleeping time exceeds the maximum wake-up period set for the low power consumption Wi-Fi MAC layer link, the low power consumption Wi-Fi MAC layer link between the device and the IoT proxy device is disconnected, so it is needed to firstly establish the link according to the above described process for establishing the low power consumption Wi-Fi MAC layer link, and then performs data pre-exchange over the low power consumption Wi-Fi MAC layer link.

9. The method for implementing a low power consumption IoT network based on a Wi-Fi proxy device according to claim 6, wherein when the Wi-Fi IoT device having a long data period needs software upgrade for itself:
i) utilize said low power consumption Wi-Fi MAC layer link to obtain upgraded software from the internet server via the proxy device;
ii) the Wi-Fi IoT device connects to the internet server via a normal Wi-Fi link with the AP, and obtains upgraded software.

10. The method for implementing a low power consumption IoT network based on a Wi-Fi proxy device according to claim 6, wherein ending of said low power consumption sleeping state is periodic or triggered by an event.

11. A low power consumption IoT network architecture for implementing a method for implementing a low power consumption IoT network based on a Wi-Fi proxy device, comprising firstly pre-establishing a low power consumption Wi-Fi MAC layer link between the proxy device and at least one Wi-Fi IoT device in a private protocol setting a maximum wake-up period from several hundred hours to several months, wherein said Wi-Fi IoT device only establishes a low power consumption Wi-Fi MAC layer link with the proxy device, without a Wi-Fi link at IP layer and above layer between the Wi-Fi IoT device and the proxy device, and the proxy device directly connects to a Wi-Fi access point via an IP layer and above layer link so as to connect to an internet server;

wherein:
  when the Wi-Fi IoT device needs to perform data exchange with the internet server, carrying data in a packet payload structure defined in MAC layer, performing data pre-exchange with the proxy device via said low power consumption Wi-Fi MAC layer link, and after the pre-exchange having completed, entering into a low power consumption sleeping state, and the proxy device forwarding data received in the pre-exchange to the internet server through an IP address and a high level protocol specified in the MAC layer packet payload, via the IP layer and above layer link; and
  when the internet server has internet data to be sent to the Wi-Fi IoT device via the link, when the Wi-Fi IoT device is in the low power consumption sleeping state, the proxy device acts as a data receiving end to buffer the above described data, and after a current low power consumption sleeping state of the Wi-Fi IoT device is ended, the buffered internet data is transmitted over the previously established low power consumption Wi-Fi MAC layer link;
  wherein the architecture includes: the proxy device, the Wi-Fi IoT device, and the internet server in wireless connection with the devices, wherein: a cache is provided in the proxy device.

12. The low power consumption IoT network architecture according to claim 11, wherein a link duration between said proxy device and the internet server is greater than a link duration between the Wi-Fi IoT device and the internet server and a link duration between the proxy device and the Wi-Fi IoT device.

13. The low power consumption IoT network architecture according to claim 11, wherein the proxy device uses a standard 802.11 protocol to connect to the Wi-Fi access point.

14. The low power consumption IoT network architecture according to claim 11, wherein said MAC layer packet payload includes: a data portion, and a payload header encapsulating the data portion, wherein: the data portion includes a data type, a data body, and a sleep flag, wherein the proxy device determines a path for forwarding the data according to the IP address carried in the MAC layer packet payload, and determines a high level link according to a high level protocol type.

15. The low power consumption IoT network architecture according to claim 11, wherein said proxy device implements data forwarding in the following manner:
  1) the proxy device always maintains the IP layer and above layer link to the internet server by uninterruptedly sending packets, and when the proxy device has received pre-exchange data from the Wi-Fi IoT device, it forwards the pre-exchange data to the internet server directly in the above described link;
  2) when the proxy device has received the pre-exchange data from the Wi-Fi IoT device, a link connection to the internet server is re-established, and then the pre-exchange data is forwarded to the internet server in the above described link.

16. The low power consumption IoT network architecture according to claim 15, wherein proxy device and the Wi-Fi IoT device implement tracking of the low power consumption sleeping state in the following manner:
  A) when the Wi-Fi IoT device is about to enter into the low power consumption sleeping state, carrying a sleep start signal to be sent to the proxy device in the MAC packet payload to be sent;
  B) when the Wi-Fi IoT device exits the low power consumption sleeping state and needs to transmit data over the previously established low power consumption Wi-Fi MAC layer link, carrying a sleep end signal in the MAC packet payload to be sent and sending the sleep end signal; and
  C) the proxy device periodically listens to the above described sleep start signal and sleep end signal, and correspondingly starts an internet data buffering process or pre-exchange data forwarding process between the proxy device and the internet server.

17. The low power consumption IoT network architecture according to claim 16, wherein when the Wi-Fi IoT device ends sleeping and prepares to transmit data, if a sleeping time does not exceed the maximum wake-up period of the low power consumption Wi-Fi MAC layer link, then the low power consumption Wi-Fi MAC layer link between the device and the IoT proxy device is not disconnected, so data pre-exchange is performed directly on the original low power consumption Wi-Fi MAC layer link; when the sleeping time exceeds the maximum wake-up period set for the low power consumption Wi-Fi MAC layer link, the low power consumption Wi-Fi MAC layer link between the device and the IoT proxy device is disconnected, so it is needed to firstly establish the link according to the above described process for establishing the low power consumption Wi-Fi MAC layer link, and then performs data pre-exchange over the low power consumption Wi-Fi MAC layer link.

18. The low power consumption IoT network architecture according to claim 15, wherein software for the Wi-Fi IoT device is upgraded by:
  i) utilizing said low power consumption Wi-Fi MAC layer link to obtain upgraded software from the internet server via the proxy device;
  ii) connecting the Wi-Fi IoT device to the internet server, via a normal Wi-Fi link with the AP, to obtain the upgraded software.

19. The low power consumption IoT network architecture according to claim 15, wherein ending of said low power consumption sleeping state is periodic or triggered by an event.

* * * * *